June 3, 1941.  W. H. SISSON  2,244,634
AIR CONDITIONING SYSTEM
Filed March 17, 1939
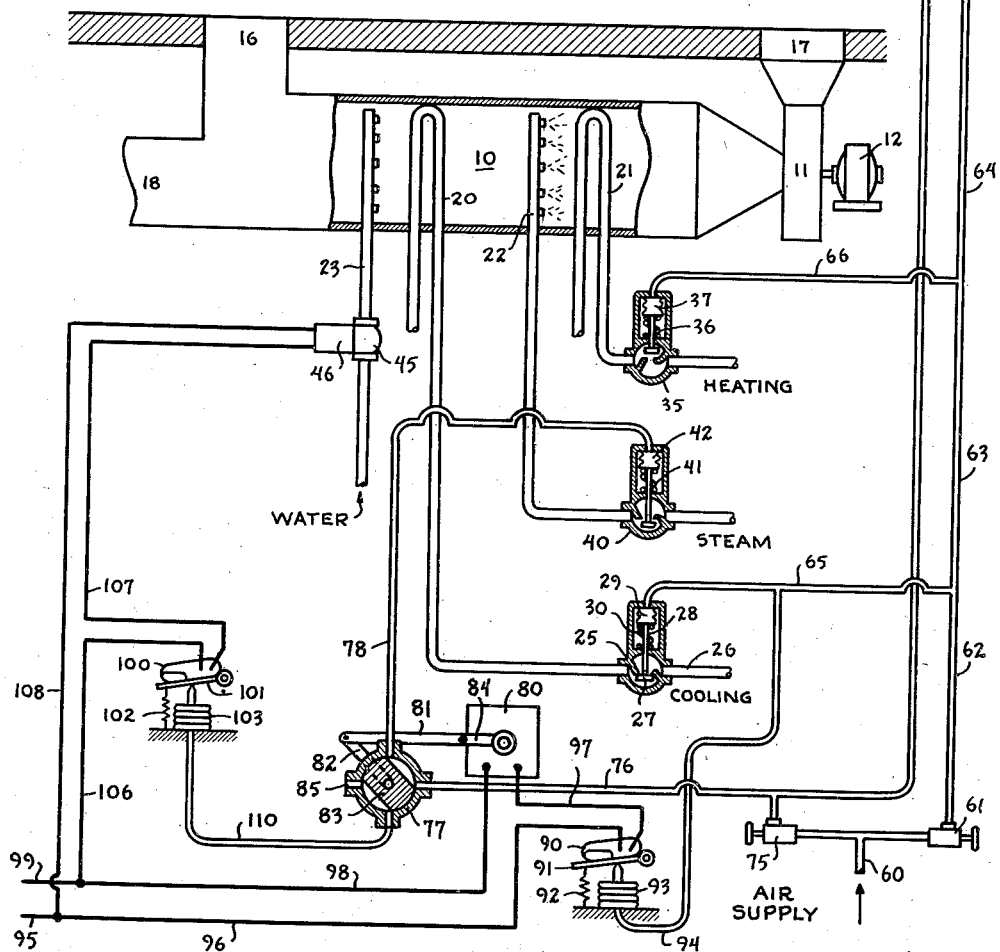
Inventor
Wilbur H. Sisson
By
George H Fisher
Attorney Patented June 3, 1941

2,244,634

UNITED STATES PATENT OFFICE 2,244,634

AIR CONDITIONING SYSTEM

Wilbur H. Sisson, Kansas City, Mo., assignor to Minneapolis-Honeywell Regulator Company, Minneapolis, Minn., a corporation of Delaware Application March 17, 1939, Serial No. 262,502

11 Claims. (Cl. 257—3)

This invention relates to an air conditioning system for an enclosure wherein both temperature and humidity must be maintained within close limits, and wherein it may often be necessary to cool and humidify the air within the enclosure at the same time, such conditions often being encountered in egg incubators.

In the operation of egg incubators wherein the temperature and humidity are not maintained within very close limits, the average loss has been found to be approximately 40% of the eggs originally set, part of this loss being due to infertile eggs, but tests have shown that the average loss can be reduced from 40% to 10% or 15% if the wet and dry bulb conditions of the air are accurately controlled. It has been found that this reduction in loss may be obtained if the dry bulb temperature is maintained at 99° F. with a variation above or below this value if not more than ¼° F., and if the wet bulb temperature is maintained at a value which will give a relative humidity of the air of about 65% with a variation above or below this value of not more than 1%.

In order to maintain the conditions in the incubator at the proper values, heating and cooling means are provided which are under the control of a dry bulb thermostat which varies the operation of the heating or cooling means to maintain the dry bulb temperature within the desired range. A wet bulb temperature responsive device controls humidifying means in a manner to maintain the relative humidity within the desired range, and humidification of the air may be effected by adding either steam or relatively cold water to the air, the dry bulb thermostat selecting which humidifying medium is to be used. If the dry bulb temperature is above the desired value and there is a need for humidification, water will be used as the humidifying medium which will assist in the cooling of the air. On the other hand, if the dry bulb temperature is below the desired value, upon a call for humidification, steam will be utilized as the humidifying medium, so that humidification of the air will not further reduce the temperature thereof. The rate at which the humidifying medium is supplied to the air is dependent upon the departure of the wet bulb temperature, or in other words, the humidity, from the desired value. In this manner it has been found possible to accurately maintain both temperature and humidity within close limits in an efficient manner, by means of a novel but not complicated, system of controls. While the system has been particularly designed for use in incubators, it should be understood that it is not limited to such applications, but is useful in any application wherein it is desirable to maintain temperature and humidity very accurately, and particularly where there is likely to be a simultaneous cooling and humidifying load, as is frequently encountered in industrial applications.

It is therefore an object of my invention to provide an air conditioning system embodying the advantages outlined above.

It is also an object of my invention to provide a control system for an air conditioning system of the type outlined above.

Other objects and advantages will become apparent upon a study of the specification, claims and appended drawing wherein is illustrated a preferred form of my invention and wherein Figure 1 illustrates schematically with certain parts in cross-section a preferred form of conditioning system and controls therefor embodying my invention, and Figure 2 is a cross-sectional view of a valve illustrated in Figure 1 with said valve shown in a different position.

Referring more particularly to Figure 1, the reference character 10 illustrates an air conditioning chamber through which air is circulated by means of a fan 11 driven by a motor 12, the fan drawing air from the conditioned space 15 into the chamber 10 by means of the inlet opening 16 and circulating the conditioned air back into the space by means of the outlet 17. A certain amount of fresh air may also be admitted to the chamber 10 through the inlet opening 18 and the proportions of fresh and return air admitted to the chamber 10 may be controlled by the provision of suitable dampers, not illustrated.

Located within the chamber 10 is a cooling coil 20, a heating coil 21, a humidifying spray 22, and a second humidifying spray 23. Any suitable cooling medium such as cold water, brine or refrigerant, may be supplied to the cooling coil 20, the flow of cooling medium being controlled by the valve 25 located in the supply pipe 26 which supplies the cooling medium to the coil 20. The valve 26 is shown to comprise a valve element 27 having the stem 28 connected to the operating bellows 29, the valve being biased towards closed position by means of the biasing spring 30. When there is sufficient pressure within the bellows 29 to overcome the force of the spring 30, the valve element 27 will move to open position, and the amount of fluid that passes through the pipe 26 will depend upon how much pressure exists within the bellows 29.

A similar valve 35 controls the flow of heating medium to the coil 21 but this valve is biased towards open position by the spring 36 which acts upon the bellows 37 so that until the pressure within the bellows is great enough to overcome the force of the spring 36 this valve will permit the flow of heating medium to the coil 21. Any suitable heating medium may be supplied to the coil 21, such as hot water, or steam.

The flow of steam or hot water to the humidifying spray 22 which as illustrated is located adjacent the heating coil 21 may be controlled by a valve 40 similar to the valve 25, this valve being normally biased towards closed position by the spring 41 acting against the operating bellows 42. The flow of humidifying medium such as cold water to the other humidifer 23 which is situated adjacent the cooling coil 20 is shown to be controlled by a valve 45, this valve being controlled by a suitable electrical means 46 which may be in the form of a solenoid and which when energized permits flow to the spray 23 but upon deenergization thereof the valve moves to closed position under the influence of gravity or any suitable biasing means.

Located within the space 15 which is being conditioned is a thermostatic element 50 which as shown is a pneumatic type of thermostat, this thermostat including element 51 having a relatively high coefficient of expansion and being fixedly supported at its lower end so that the upper end thereof will move upwardly or downwardly as the temperature in the space 15 increases or decreases. Supported adjacent the element 51 is a flapper valve 52 pivoted at 53 and having a portion engaging the abutment 54 carried by the adjusting screw 55, this flapper valve 52 cooperating with a nozzle 56. The arrangement is such that as the temperature in the space 15 increases the expansion of the element 51 will cause the upper end thereof to move upwardly so that the member 54 will move upwardly with respect to the flapper valve 52 which moves towards the nozzle 56 to partially close the same, the degree of opening of this nozzle varying in accordance with the temperature in the space 15. This thermostat is arranged to control the supply of air to the bellows 29 and 37 of the valves 27 and 35 as explained below.

The pipe 60 is connected to a supply of air which in ordinary practice is at 15 pounds pressure, the air showing past a restriction 61 and pipes 62, 63, and 64 to the nozzle 56. The bellows 29 communicates with the air supply by means of the pipes 62 and 65 and the bellows 37 communicates with the air supply by means of the pipes 62, 63, and 66. Since the supply of air in the pipe 60 is maintained constant, the pressure within the bellows 29 and 37 will depend upon the opening of the nozzle 56 at the thermostat 50 since the opening of the nozzle determines the pressure in the system downstream of the restriction 61. As the temperature of the space increases and the nozzle is partially closed, less air will escape therefrom and accordingly the pressure within the bellows 29 and 37 will increase. The bellows 37 causes the valve 35 to be wide open when the pressure in the bellows is zero pounds and as the pressure increases the valve moves towards closed position and is in closed position when the pressure attains a value of 7½ pounds, for example. Should the temperature in the space continue to rise and the nozzle 56 become more restricted, permitting the pressure in the system to further increase above 7½ pounds, the force of the spring 30 in the valve 25 will be overcome so that this valve will start to move to open position and this valve will be in wide open position when the nozzle 56 is entirely closed off and the pressure in the bellows builds up to 15 pounds. It will thus be seen that as the temperature in the space rises above a predetermined value, the valve 52 will restrict the escape of air from the low pressure side of the restriction 61 by way of the nozzle 56 whereupon the valve 25 will open and permit flow of cooling medium to the cooling coil 20, the rate at which the cooling medium is supplied varying in accordance with the rise in temperature above this predetermined value. When the temperature in the space is at the desired value, the pressure in the system will be such that both the valves 25 and 35 will be closed but should the temperature drop below the desired value the pressure in the system will decrease and the spring 36 will cause opening of the valve 35 to permit the flow of heating medium to the coil 21. Thus the temperature in the space is accurately controlled by the thermostat 50 by supplying heating or cooling medium to the coils 21 and 20, respectively, in varying amounts according to the heating or cooling demand of the space 15.

Also located within the space is a wet bulb temperature responsive device 70 which is similar in construction to the thermostat 50 except that this wet bulb thermostat is provided with a suiable wick 71 connected to the temperature sensitive element and having its lower end terminating in the moistening devce 72 for maintaining the wick 71 moistened. The flapper valve 73 of this controller acts in the reverse direction from that of the thermostat 50 or in other words, closes the opening of the nozzle 74 when the wet bulb temperature is low. This wet bulb thermostat controls the flow of air to the operating bellows 42 of the valve 40 which controls the supply of steam to the humidifying spray 22. This bellows is connected with the air supply pipe 60 by means of the restriction 75, pipe 76, valve member 77, and pipe 78, this communication being permitted when the valve member is in the position shown. With the valve 77 in the position illustrated, as the wet bulb temperature in the space decreases and the nozzle 74 is shut off, the air pressure will build up within the bellows 42, thus moving the valve 40 towards open position and permitting the supply of steam to the spray 22 for increasing the humidity of the space.

The valve 77 is controlled by a motor 80 which may be a two-position motor and is connected by means of the link 81 and the arm 82 to the valve element 83 of the valve 77. When the motor is deenergized, the valve element 83 is maintained in the position illustrated, but upon energization of the motor 80 the arm 84 is rotated through 180° which causes movement of the valve element 83 through 90° into the position illustrated in Figure 2 wherein communication between the pipes 76 and 78 is prevented. The valve 77 is provided with a bleed port 85 which permits the flow of air from the bellows 42 outwardly therethrough when the valve is in the position of Figure 2 so that the pressure within the bellows 42 is reduced and the valve 40 is closed.

The energization of the motor 80 is controlled by a mercury switch 90 mounted on the pivoted arm 91 which is biased by means of the spring 92 into engagement with the bellows 93. The interior of this bellows is connected by the pipe 94 to the pipe 65 so that the pressure within the bellows 93 will be substantially the same as within the bellows 29 of the valve 25. When the dry bulb temperature within the space 15 rises above the desired value and the pressure within the bellows 29 becomes high enough to move the value 25 to open position, the pressure within the bellows 93 will also rise high enough so that the mercury switch 90 is tilted to circuit making position, at which time current flows to the motor 80 from the line wire 95 through conductor 96, switch 90, conductor 97, motor 80, and conductor 98 to the line wire 99, the line wires being connected to any suitable source of power, not shown. Accordingly, whenever the dry bulb temperature within the space 15 is excessive the motor 80 is energized and the valve element 83 of the valve 77 is moved to the position shown in Figure 2, thus relieving the pressure in the bellows 42 of the valve 40 and preventing communication between the bellows and the air supply so that the valve 40 cannot be opened regardless of how high the wet bulb temperature in the space 15 may rise.

The solenoid 46 for controlling the valve 45 which controls the supply of water to the spray 23 may be controlled by a mercury switch 100 mounted on the arm 101 which is biased by means of a spring 102 into engagement with the bellows 103. When the pressure within the bellows 103 is sufficiently high, the mercury switch 100 will be tilted to circuit closing position which will cause the energization of the solenoid 46 by means of the follow circuit: from the line wire 99 through conductor 106, switch 100, conductor 107, solenoid 46, and conductor 108 to the line wire 95. Thus whenever sufficient pressure exists within the bellows 103, the solenoid 46 is energized and water flows to the spray 22 for humidification purposes.

When the valve element 83 of the valve 77 is in the position shown in Figure 2, the bellows 103 is connected with the air supply pipe 60 by means of the restriction 75, pipe 76, valve 77, and pipe 110. At this time, the pressure within the bellows will depend upon the wet bulb temperature of the space 15 and if the wet bulb temperature is below the desired value the nozzle 74 of the thermostat 70 will be partially shut off so that the pressure will build up within the bellows 103 to such an extent that the switch 100 is moved to closed position whereupon the solenoid 46 is energized, valve 45 is opened, and water flows to the spray 23. It will accordingly be seen that the position of the valve element 83 of the valve 77 determines whether the bellows 103 or the bellows 42 of the valve 40 will be under the control of the wet bulb thermostat. When the dry bulb temperature in the space is above the desired value and valve 77 is in the position shown in Figure 2, the valve 45 controlling the flow of water to the spray 22 will be under the control of the wet bulb thermostat and will be opened whenever the wet bulb temperature in the space is below the desired value. On the other hand, if the space dry bulb temperature drops below the desired value, the motor 80 will be deenergized whereupon the valve 77 moves to the position illustrated, suitable biasing means, not illustrated, being provided to cause the return of the valve to this position, which places the bellows 42 of the valve 40 in communication with the air supply and accordingly this valve is under the control of the wet bulb thermostat and will open as the wet bulb temperature of the air drops below the desired value. At the same time, the pipe 110 which is connected to the bellows 103 will also be connected to atmosphere by means of the bleed port 85 of the valve 77 so that the pressure within this bellows will be relieved and the mercury switch 100 will move to the position illustrated under the influence of the biasing spring 102. It should be understood that motor 80 for controlling the valve 77 may have two separate windings, each of which causes 180° rotation of arm 84, and the windings may be selectively energized, depending upon the position of the mercury switch 90.

Since the dry bulb temperature will be maintained within very close limits, it will be obvious that the relative humidity of the space may be accurately controlled by controlling the wet bulb temperature of the air in the space 15. If the dry bulb temperature of the space is below the desired value, the heating coil 21 will be in operation so as to raise the temperature of the air passing through the chamber 10, and if the humidity of the space should be too low as reflected by the wet bulb temperature of the air, steam will be supplied to the spray 22 to humidify the air and the steam will also tend to raise the dry bulb temperature of the air so as to assist the coil 21 in the heating thereof. On the other hand, if the dry bulb temperature should rise above the desired value, cooling medium will be supplied to the cooling coil to decrease the temperature of the air flowing through the chamber 10, and if at this time there should be a call for humidification, the valve 45 which supplies water to the water spray will open and water, which will be at a relatively low temperature compared to the temperature of the humidifying medium flowing from the other humidifying spray, will increase the humidity of the air without raising the temperature thereof, but instead this cool water will lower the dry bulb temperature to some extent thus assisting the coil 20 in reducing the dry bulb temperature of the air within the space 15.

It will thus be seen that the dry bulb thermostat controls the heating and cooling coils in accordance with the dry bulb temperature of the air in the space and at the same time this dry bulb thermostat selects whether the spray 22 or the spray 23 will operate in accordance with a demand for humidification of the air by the wet bulb thermostat 70.

It will be obvious that the control system of this invention is useful in any application wherein it may be necessary to cool and humidify at the same time. In the control of incubators wherein a considerable amount of heat is generated by the eggs in the process of incubation, the temperature of the air in the incubator may become so high that external cooling is necessary but at the same time the humidity may be below the desired value. It will be obvious that many modifications of the system may be made without the exercise of invention. For example, the wet bulb thermostat 70 might be replaced by any suitable form of humidity responsive element and it should also be understood that the valve 45 may be operated pneumatically in the same manner as the other valves shown and described, or if desired these other valves may be operated electrically in any suitable manner.

Also, valve 45 may be a modulating type of valve, operated by a proportioning type motor, the mercury switch 100 being replaced by a suitable potentiometer controller for suitably controlling the proportioning motor. In such case, the amount of water must be maintained sufficient to secure proper atomization thereof. The wet and dry bulb thermostats may be combined in an instrument for indicating and recording the wet and dry bulb temperatures in the space as well as controlling these temperatures, such as instruments for this purpose manufactured by the Brown Instrument Company of Philadelphia. Thus while I have illustrated and described one embodiment of my invention by way of example, it should be understood that the invention is limited only by the scope of the appended claims.

I claim as my invention:

1. In an air conditioning system, an air conditioning chamber, means for circulating air through said chamber and through a space to be conditioned, means for heating the air passing through said chamber, means for cooling the air passing through said chamber, first and second means for adding moisture to the air passing through said chamber, means for supplying moisture to said first moisture adding means at high temperature, means for supplying moisture to said second moisture adding means at low temperature, means responsive to a condition indicative of the humidity of the air in the enclosure for controlling said first and second moisture adding means, and means responsive to the dry bulb temperature of the air in the enclosure for selectively placing the first or second moisture adding means under the control of said last named means and for controlling the heating and cooling means.

2. In an air conditioning system, a first humidifying means, a second humidifying means, means for supplying a humidifying medium to said first humidifying means at a low temperature, means for supplying a humidifying medium to said second humidifying means at a high temperature, means responsive to the humidity of the air in the space being conditioned, and means responsive to the dry bulb temperature of the air in the space for selectively placing the first humidifying means or the second humidifying means under the control of the humidity responsive means.

3. In an air conditioning system, a first humidifying means, a second humidifying means, means for supplying a humidifying medium to said first humidifying means at a low temperature, means for supplying a humidifying medium to said second humidifying means at a high temperature, means responsive to the humidity of the air in the space being conditioned, means responsive to the dry bulb temperature of the air in the space for selectively placing the first humidifying means or the second humidifying means under the control of the humidity responsive means, and means controlled by said dry bulb temperature responsive means for maintaining the air in the space within predetermined values.

4. In an air conditioning system for a space in combination, humidifying means for humidifying the air in the space, a source of relatively hot humidifying medium for said humidifying means, a source of relatively cool humidifying medium for said humidifying means, a first valve for controlling the flow of hot humidifying medium, a second valve for controlling the flow of cool humidifying medium, control means actuated in accordance with the humidity of the air, and thermostatic means for placing said control means in control of said first valve when heating of the space is required while placing said control means in control of said second valve when cooling is required.

5. In an air conditioning system for a space in combination, humidifying means for humidifying the air in the space, a source of relatively hot humidifying medium for said humidifying means, a source of relatively cool humidifying medium for said humidifying means, a first valve for controlling the flow of hot humidifying medium, a second valve for controlling the flow of cool humidifying medium, control means actuated in accordance with the humidity of the air, thermostatic means for placing said control means in control of said first valve when heating of the space is required while placing said control means in control of said second valve when cooling is required, means for heating and cooling said space, and means also controlled by said thermostatic means for controlling said heating and cooling means.

6. In an air conditioning system for a space, in combination, means for heating and cooling a space, said means utilizing heating or cooling medium, thermostatic means for controlling said heating and cooling means in a manner to cause heating of the space upon fall in temperature and cooling of the space upon rise in temperature, humidifying means for humidifying the air in said space, means for supplying humidifying medium to said humidifying means at temperatures differing from and independent of the temperature of the medium supplied to the heating and cooling means, control means for determining the temperature of the humidifying medium supplied to said humidifying means in a manner to supply relatively cool medium when cooling is necessary and to supply relatively warm medium when heating is necessary, and means actuated in accordance with the humidity of the air for controlling the flow of humidifying medium.

7. In an air conditioning system for a space, in combination, means for heating and cooling a space, said means utilizing heating or cooling medium, thermostatic means for controlling said heating and cooling means in a manner to cause heating of the space upon fall in temperature and cooling of the space upon rise in temperature, humidifying means for humidifying the air in said space, means for supplying humidifying medium to said humidifying means at temperatures differing from and independent of the temperature of the medium supplied to the heating and cooling means, control means including said thermostatic means for determining the temperature of the humidifying medium supplied to said humidifying means in a manner to supply relatively cool medium when cooling is necessary and to supply relatively warm medium when heating is necessary, and means actuated in accordance with the humidity of the air for controlling the flow of humidifying medium.

8. In an air conditioning system for a space, in combination, humidifying means for humidifying the air in the space, means for supplying humidifying medium to said humidifying means at varying temperatures, said last mentioned means including control means for varying the temperature of the supplied humidifying medium, a controller responding to humidity in the space, connections between said controller and said control means for causing said controller to control the action of said humidifying means, means interposed in said connections for determining whether relatively hot or relatively cool medium shall be supplied to said humidifying means under the control of said controller, and means responsive to the temperature of the space for controlling said interposed means.

9. In an air conditioning system for a space, in combination, humidifying means for humidifying the air in the space, means for supplying humidifying medium to said humidifying means at varying temperatures, said last mentioned means including control means for varying the temperature of the supplied humidifying medium, a controller responding to humidity in the space, connections between said controller and said control means for causing said controller to control the action of said humidifying means, means interposed in said connections for determining whether relatively hot or relatively cool medium shall be supplied to said humidifying means under the control of said controller, thermostatic means responsive to the temperature of the space for controlling said interposed means, and heating and cooling means for said space, said heating and cooling means also being controlled by said thermostatic means.

10. In an air conditioning system for a space, in combination, means for heating and cooling a space, said means utilizing heating or cooling medium, thermostatic means for controlling said heating and cooling means in a manner to cause heating of the space upon fall in temperature and cooling of the space upon rise in temperature, humidifying means for humidifying the air in said space, means for supplying humidifying medium to said humidifying means at temperatures differing from and independent of the temperature of the medium supplied to the heating and cooling means, control means for determining the temperature of the humidifying medium supplied to said humidifying means in a manner to supply relatively cool medium when cooling is necessary and to supply relatively warm medium when heating is necessary, and means responsive to the humidity of the air in said space for controlling the humidifying action of said humidifying means.

11. In an air conditioning system for a space, in combination, humidifying means for humidifying the air in the space, means for supplying humidifying medium to said humidifying means at different temperatures, said last mentioned means including control means, a controller responding to humidity in the space, connections between said controller and said control means for causing said controller to control the action of said humidifying means, means interposed in said connections for determining whether relatively hot or relatively cool medium shall be supplied to said humidifying means, and means responsive to the temperature of the space for controlling said interposed means.

WILBUR H. SISSON.